Nov. 13, 1951     R. R. STOKES     2,574,600

DECELEROMETER

Filed Aug. 13, 1945

INVENTOR
ROBERT R. STOKES

BY

ATTORNEY

Patented Nov. 13, 1951

2,574,600

UNITED STATES PATENT OFFICE 2,574,600

DECELEROMETER

Robert R. Stokes, Pasadena, Calif., assignor to the United States of America as represented by the Secretary of the Navy Application August 13, 1945, Serial No. 610,654

2 Claims. (Cl. 264—1)

This invention relates to instruments for measuring the deceleration of moving bodies and, particularly, to decelerometers for measuring the rate of change of velocity of projectiles, bombs, torpedoes and the like upon impact with water or solid objects.

When an ordnance missile strikes its target or some dense medium, such as water, through which it must pass to reach the target, the deceleration accompanying the impact imposes a great mechanical strain upon the body of the missile as well as upon its internal components. The hull of an aircraft torpedo, for example, must be constructed strongly enough to withstand water impacts without becoming distorted; likewise, the engine used to propel the aircraft torpedo through the water must be sturdy in its design and secure in its mounting to prevent any undesirable displacement thereof, or of any of its components, due to deceleration forces set up by water impacts.

It can be readily seen, then, that a factor which greatly influences the design of an ordnance missile is the deceleration it will be expected to encounter in its normal use. While the deceleration in any particular case can be found by several known empirical methods, the values arrived at by these methods are only rough approximations at best and designs based on such values may suffer as a consequence. It is to the improvement of methods of measuring the deceleration of ordnance missiles on impact with various targets that the present invention is particularly addressed.

Accordingly, a primary object of this invention is to provide an instrument capable of measuring the force of deceleration accompanying the impact of an ordnance missile upon water or solid targets.

Another object of the invention is to provide a decelerometer which will measure true values of deceleration of a moving body notwithstanding the occurrence of deceleration components perpendicular to the axis along which the deceleration is measured.

For a better understanding of the invention and other objects and advantages thereof, reference may be had to the following description and drawing in which.

Figure 1:
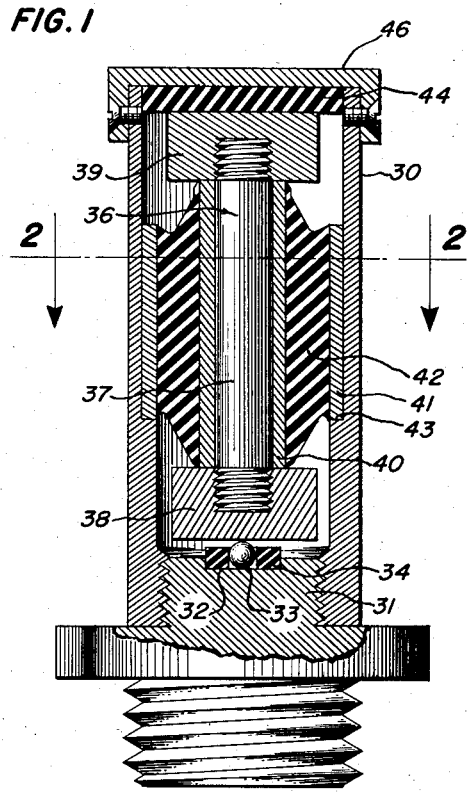
Figure 1 is a longitudinal view, partly in section, of my invention.
Figure 2:
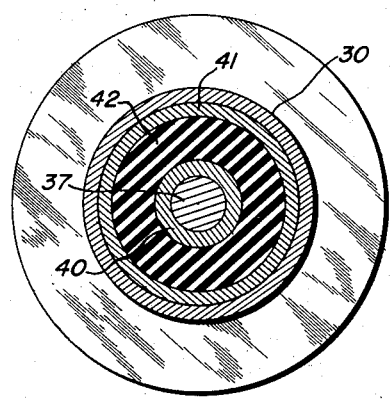
Figure 2 is a sectional view along line 2—2 of the decelerometer represented in Figure 1.

The construction shown in Figures 1 and 2 may employ the indentor or "copper ball" type of stress member and may be so designed as to be virtually insensitive and inoperative until the deceleration forces exceed a predetermined value. A cylindrical case 30 is provided at one end with an anvil member 31 having a recess 32 therein which receives a stress member 33, preferably a copper ball, held in place by a washer 34 of soft rubber or the like. The stress member is positioned for engagement by a weight member 36 which comprises a stem 37 and end pieces 38 and 39. A unitary mounting comprising an inner sleeve 40 and an outer sleeve 41, joined by a web 42 of elastic material, preferably rubber, supports the weight member 36. Outer sleeve 41 is press-fitted into case 30 until the former engages shoulder 43 of the latter. A cushioning pad 44 is interposed between end piece 39 and a cap 46 which is securely fastened to the end of case 30.

The decelerometer is suitably mounted in the projectile, bomb or torpedo in such a manner that, when the motion of case 30 is arrested, the weight member 36 moves relative to case 30 and exerts a force proportional to its mass and deceleration upon stress member 33. Where a soft metal stress member, such as a copper ball, is used, the deceleration accompanying any impact will be demonstrated by a flattening of the ball between weight member 36 and anvil portion 31. Measuring the reduction in diameter of the ball, between the flat surfaces, furnishes the index from which the deceleration value is obtained. The actual movement of the weight member is quite small, and no appreciable friction losses are involved because of the yieldable character of the weight member mountings.

While what has been described herein is particularly illustrative of a presently preferred embodiment of my invention, it is not intended that the scope of the invention be limited thereto but that it embrace any modifications and changes which fall within the true spirit of the invention, as covered by the appended claims, occurring to those skilled in the art.

I claim:

1. A decelerometer of the class described comprising a cylindrical housing containing a concentric first sleeve secured to the inner cylindrical surface thereof, an inertia responsive striker portion disposed within said first sleeve and including a second sleeve, a stem disposed concentrically within said second sleeve, and two inertia masses, each removably secured to an opposite end of said stem, and each abutting a respective end of said second sleeve, yieldable resilient means interposed between said first and second sleeves and secured to the entire exposed surfaces thereof, an anvil portion aligned with said striker portion, and stress means including a soft metal ball interposed between said striker portion and said anvil portion, said stress means having a lesser degree of hardness than and deformable by said striker portion and said anvil portion.

2. A decelerometer as defined in claim 1, including a resilient washer around the stress means to hold the stress means in position.

ROBERT R. STOKES.

REFERENCES CITED

The following references are of record in the file of this patent:

UNITED STATES PATENTS

| Number | Name | Date |
|---|---|---|
| 1,155,471 | Davis | Oct. 5, 1915 |
| 1,393,989 | Zubler | Oct. 18, 1921 |
| 1,773,802 | Ballentine | Aug. 26, 1930 |
| 2,087,566 | Blevans | July 20, 1937 |
| 2,163,847 | Perrey | June 27, 1939 |
| 2,195,451 | Edwards | Apr. 2, 1940 |
| 2,237,326 | Barry | Apr. 8, 1941 |
| 2,362,484 | Hickman | Nov. 14, 1944 |